United States Patent [19]

Bongard et al.

[11] Patent Number: 5,775,508
[45] Date of Patent: Jul. 7, 1998

[54] DISK PACKAGE FOR ROTATING MEMORY DISKS

[75] Inventors: Lynn R. Bongard; Larry G. Dressen. both of Waconia, Minn.

[73] Assignee: Empak, Inc., Chanhassen, Minn.

[21] Appl. No.: 778,977

[22] Filed: Jan. 6, 1997

[51] Int. Cl.⁶ ........................................... B65D 85/48
[52] U.S. Cl. .................... 206/711; 206/454; 206/508
[58] Field of Search ......................... 206/454, 711, 206/508; D9/341, 431, 432, 424

[56] References Cited

U.S. PATENT DOCUMENTS

| | | |
|---|---|---|
| D. 344,891 | 3/1994 | Dressen ................. D9/424 |
| 4,061,228 | 12/1977 | Johnson . |
| 4,248,346 | 2/1981 | Johnson . |
| 4,450,960 | 5/1984 | Johnson . |
| 4,588,086 | 5/1986 | Coe ..................... 206/711 X |
| 4,793,488 | 12/1988 | Mortensen . |
| 4,817,799 | 4/1989 | Gregerson et al. . |
| 4,966,284 | 10/1990 | Gregerson et al. . |
| 5,025,926 | 6/1991 | Gregerson et al. . |
| 5,228,568 | 7/1993 | Ogeno et al. ............ 206/711 |
| 5,255,543 | 10/1993 | Wittmam . |
| 5,255,797 | 10/1993 | Ros ................... 206/424 X |
| 5,273,159 | 12/1993 | Gregerson . |
| 5,555,981 | 9/1996 | Gregerson . |

*Primary Examiner*—Bryon P. Gehman
*Attorney, Agent, or Firm*—Haugen and Nikolai

[57] ABSTRACT

A package for storing and shipping memory disks is disclosed. The package includes a base and cover designed to enclose and seal a plurality of disks held in a cassette. The base and cover include re-enforcing gussets and members for securely retaining the cassette and disks so that the disks do not tilt, rattle or otherwise move during transport.

9 Claims, 14 Drawing Sheets

DISK PACKAGE FOR ROTATING MEMORY DISKS

BACKGROUND OF THE INVENTION

The present invention relates generally to packaging used for large capacity, magnetic disk storage products. More specifically, the present invention relates to an improved package for storing and transporting flat circular disks used for storage of digital information in computer disk drives.

The disks used to store digital information are very fragile. Such disks can be easily scratched or warped. When such disks are scratched or warped, their usefulness in reliably storing and playing back information is destroyed.

Any number of factors can contribute to scratching, warping, or denting of the memory disks. The disks can rub against each other or contact other items during manufacturing and thereby damage the surface which must remain perfectly flat for proper operations in a hard disk drive system. Disks can be damaged by the very equipment used to process them into rotating memory platters. Such disks can also be damaged by process carriers and packaging used to store and transport the disks during manufacture. Finally, the disks can be damaged and contaminated by particles generated by movement of the disks within a disk package.

The principal object of the present invention is to provide an improved package which securely holds a plurality of disks to substantially reduce scratching and damage thereof. This objective is achieved by the present invention in several ways.

First, the package of the present invention is designed to not only hold the disks, but also to hold a shipping cassette in which the disks are held. This arrangement reduces the number of times the disks need be transferred from one holder to another during successive processing steps, and thus reduces damaging likely to occur during repeated insertion and removal of the disks from their holders.

Second, the top and bottom members of the disk package of the present invention are self-aligning, providing a telescoping fit. This self-aligning, telescoping fit protects the disks from damage which might otherwise be caused by misalignment as the top and bottom members are assembled together after being filled with the memory disks.

Third, the top cover is provided with locators which keep the disks from contacting one another, and with cushions which prevent movement or rattling of the disks within the package.

Fourth, all latches used in the design are on the outside of the package. This prevents any minute particles created by engaging or disengaging the latch from contaminating the interior of the package where such particles could adhere to or scratch the disks.

Fifth, the outside walls of the package are gusseted for strength. This reduces flexing of the walls and any resulting generation of contaminating particles or inadvertent contact of the disks with one another. The walls of the package are also designed to retain the disk cassette in proper alignment and are configured to cooperate with the cassette to increase the overall strength of the walls.

Sixth, the base and cover of the package are designed so that several such disk containing packages can be easily stacked one on top of the other. Packages can also be easily removed from a stack without causing disks in the package to move in relation to the components of the package and be thereby scratched or warped.

The advantages of the present invention and how they are achieved will become more clear from a reading of the following detailed description, in conjunction with the accompanying drawings and the appended claims, all of which form this specification.

DETAILED DESCRIPTION OF THE PREFERRED EMBODIMENT

The disk package 1 of the present invention includes a base 2 and a cover 4. The base 2 and cover 4 are specifically designed to hold and protect a disk cassette 6 (shown in FIGS. 6, 7, 11, 12, 14, 15, 18 and 19) and a plurality of magnetic memory disks 8 disposed in the cassette. The cover 4 is removable from the base 2 to permit easy insertion and removal of the cassette 6 and disks 8. The cassette 6 and disks 8 are typically inserted into and removed as a unit from base 2.

Base 2 will now be described in detail. As shown in FIGS. 1, 5, 12 and 21, the base 2 has a closed bottom 10, an open top (FIG. 12), a continuous side wall 14 projecting up from the closed bottom 10, and a continuous rim 16 projecting horizontally outward from the side wall 14 near the top 18 of side wall 14. The base 2 has two opposing shorter sides 20 and 22 and two opposing longer sides 24 and 26. The closed bottom 10 has raised center section 28 (FIG. 7) surrounded by a depression or channel 30 of generally U-shaped cross-sections. The outer surface 32 of channel 30 can be used to support the base 2 on a flat work surface. The channel 30 is also designed to receive the bottom legs of cassette 6 and thereby supports cassette 6 on inner surface 34 of channel 30.

Figure 1:
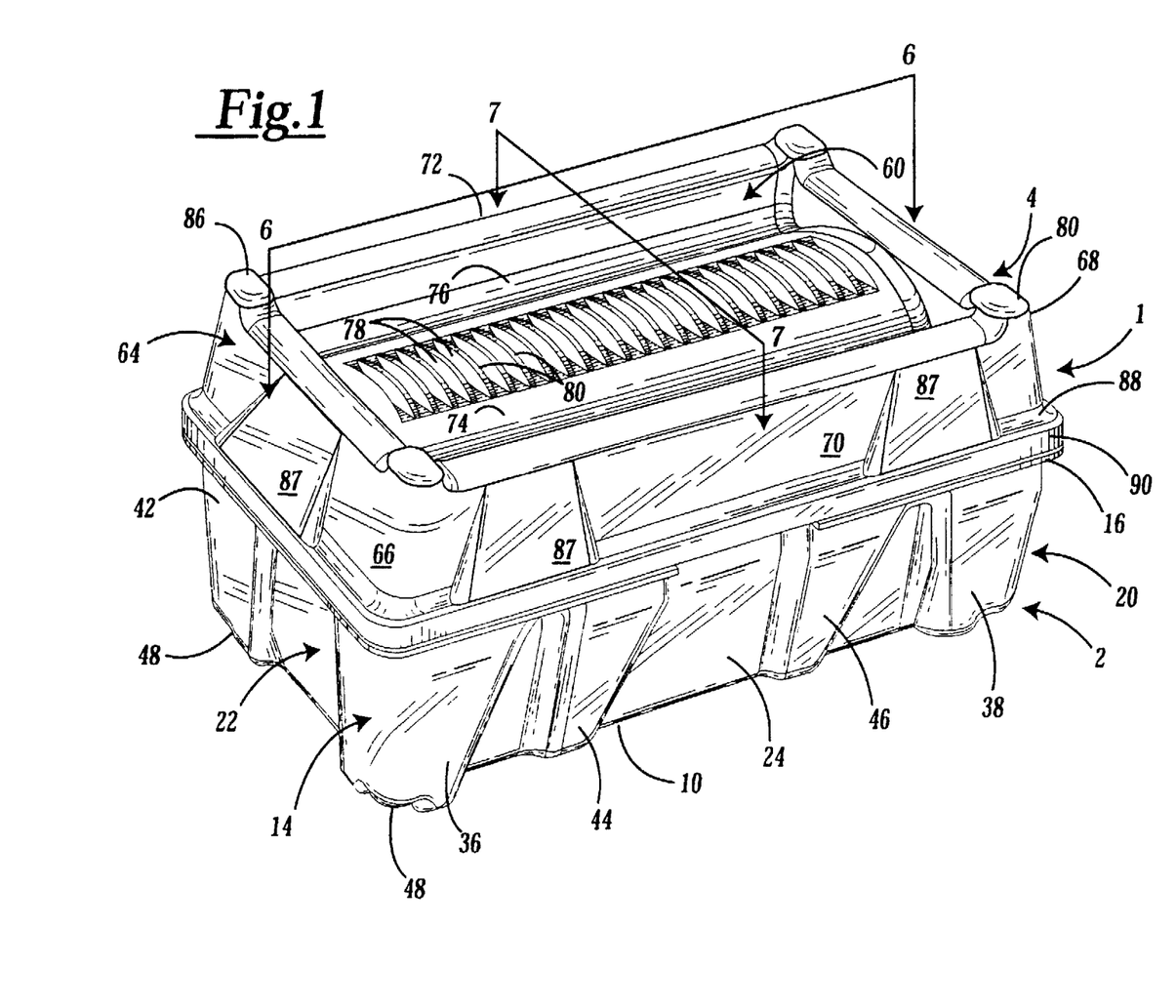
FIG. 1 is a perspective view of the improved disk package with the base and cover in the closed position.
Figure 2:
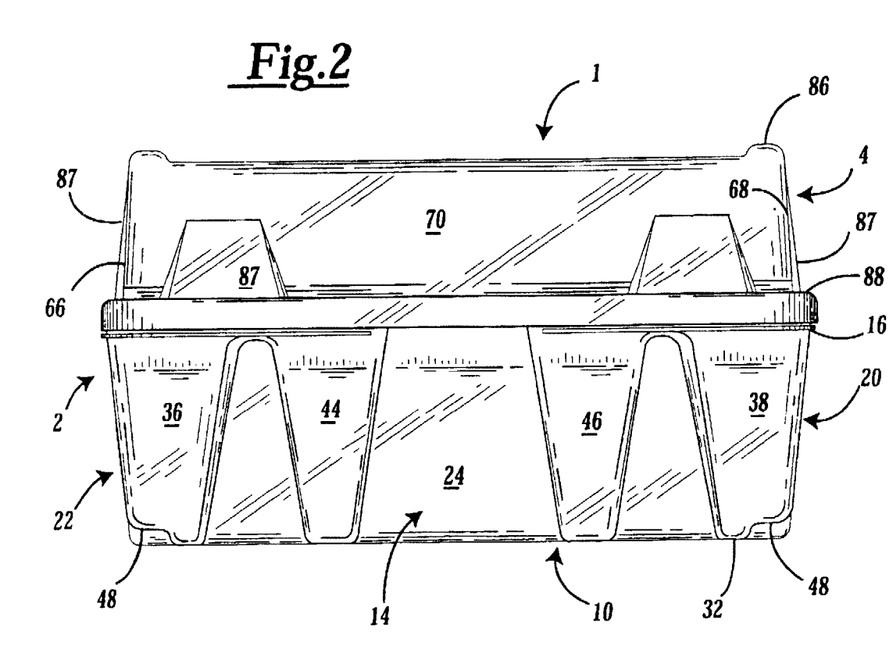
FIG. 2 is an elevational view of one of the longer sides of the improved disk package, the opposite side being the mirror image thereof.
Figure 3:
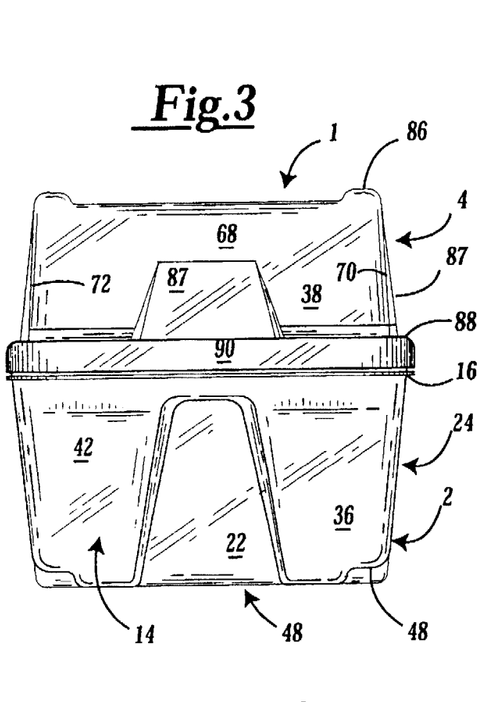
FIG. 3 is an elevational view of one of the shorter sides of the improved disk package, the opposite side being the mirror image thereof.
Figure 4:
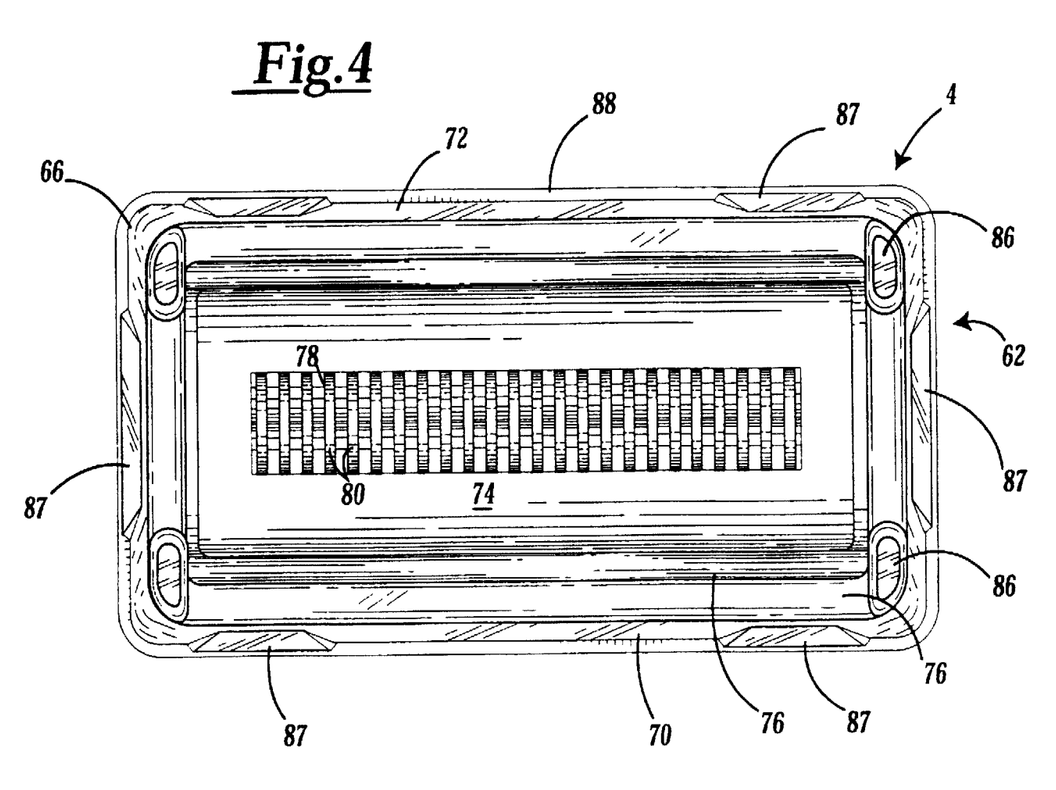
FIG. 4 is a top plan view of the cover of the improved disk package.
Figure 5:
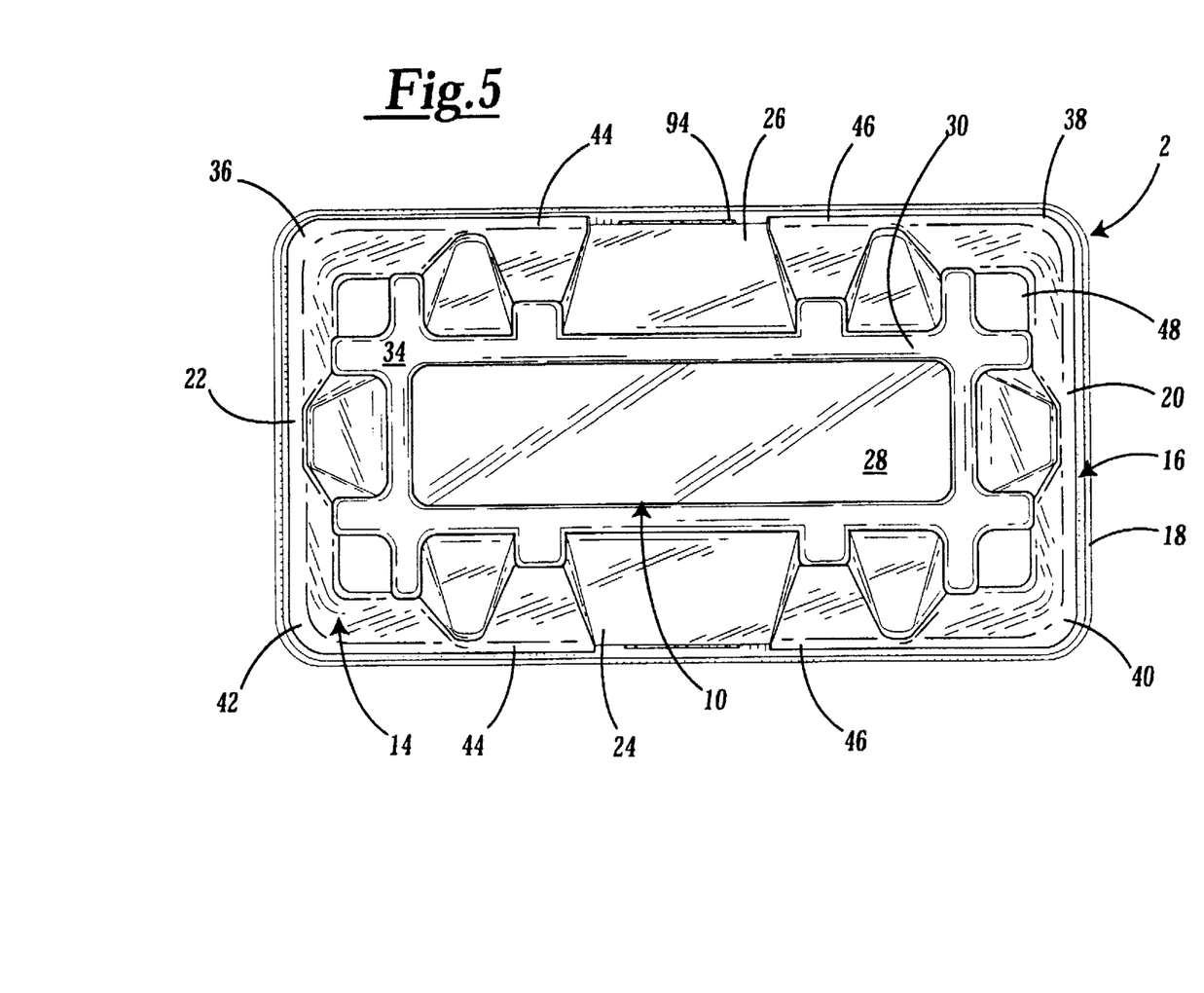
FIG. 5 is bottom plan view of the base of the improved disk package.
Figure 6:
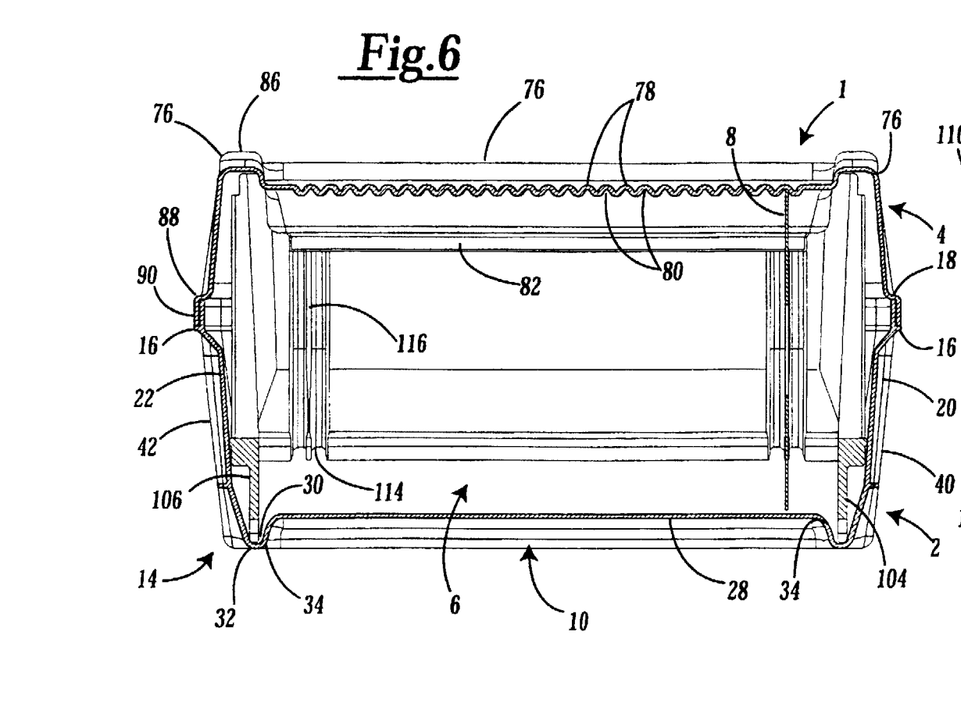
FIG. 6 is a cross-section through line 6—6 in FIG. 1.
Figure 7:
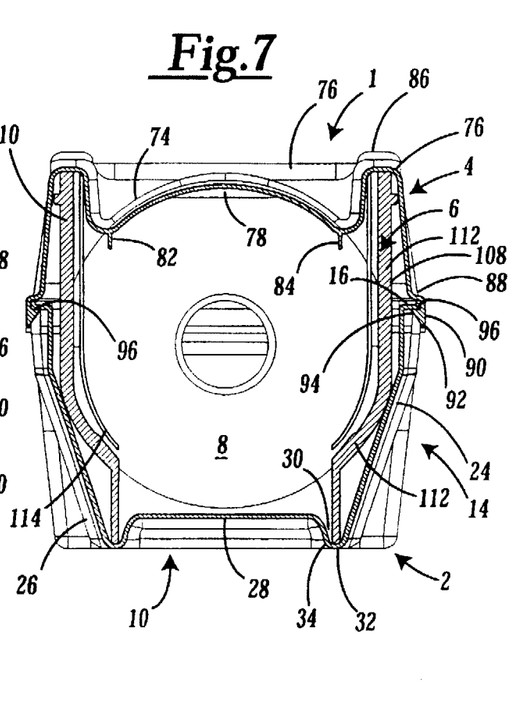
FIG. 7 is a cross section through line 7—7 in FIG. 1.
Figure 8:
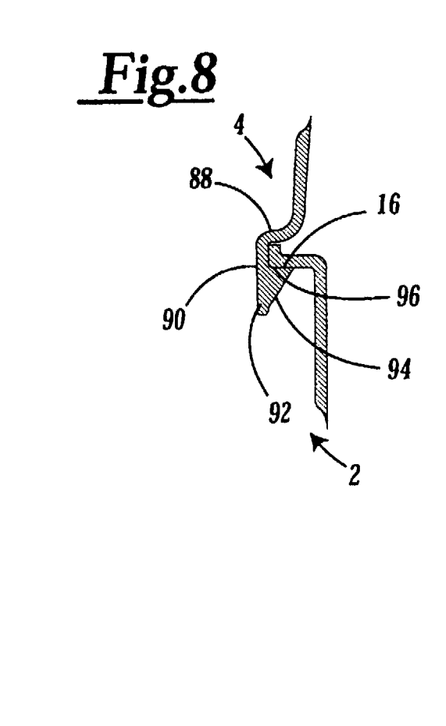
FIG. 8 is an enlarged view showing the arrangement for latching the base to the cover.
Figure 9:
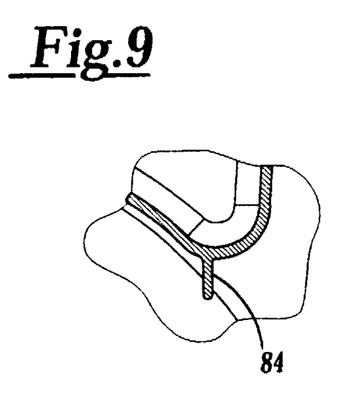
FIG. 9 is a cross-sectional view showing one of the cushions used to keep the disks from rattling or tilting within the disk package.
Figure 10:
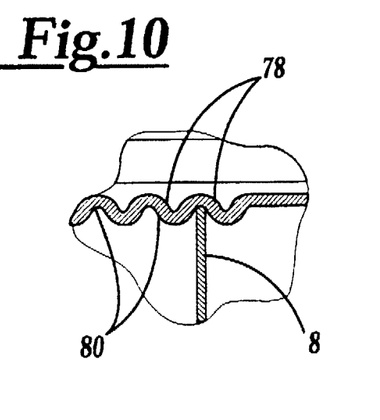
FIG. 10 is a cross-sectional view showing how a disk is received within a slot defined by the teeth of the cover.
Figure 11:
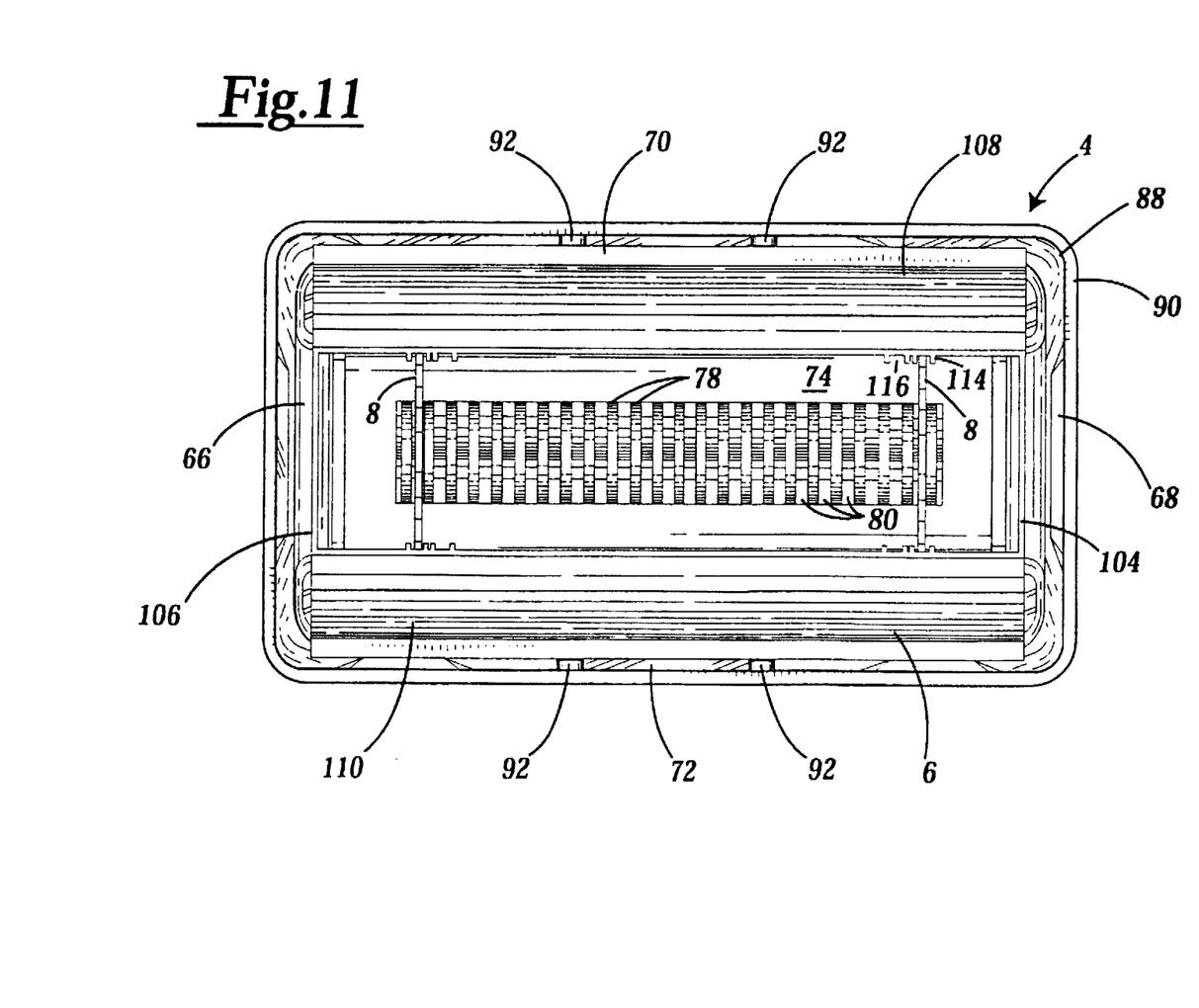
FIG. 11 is a view of the inside of the cover.
Figure 12:
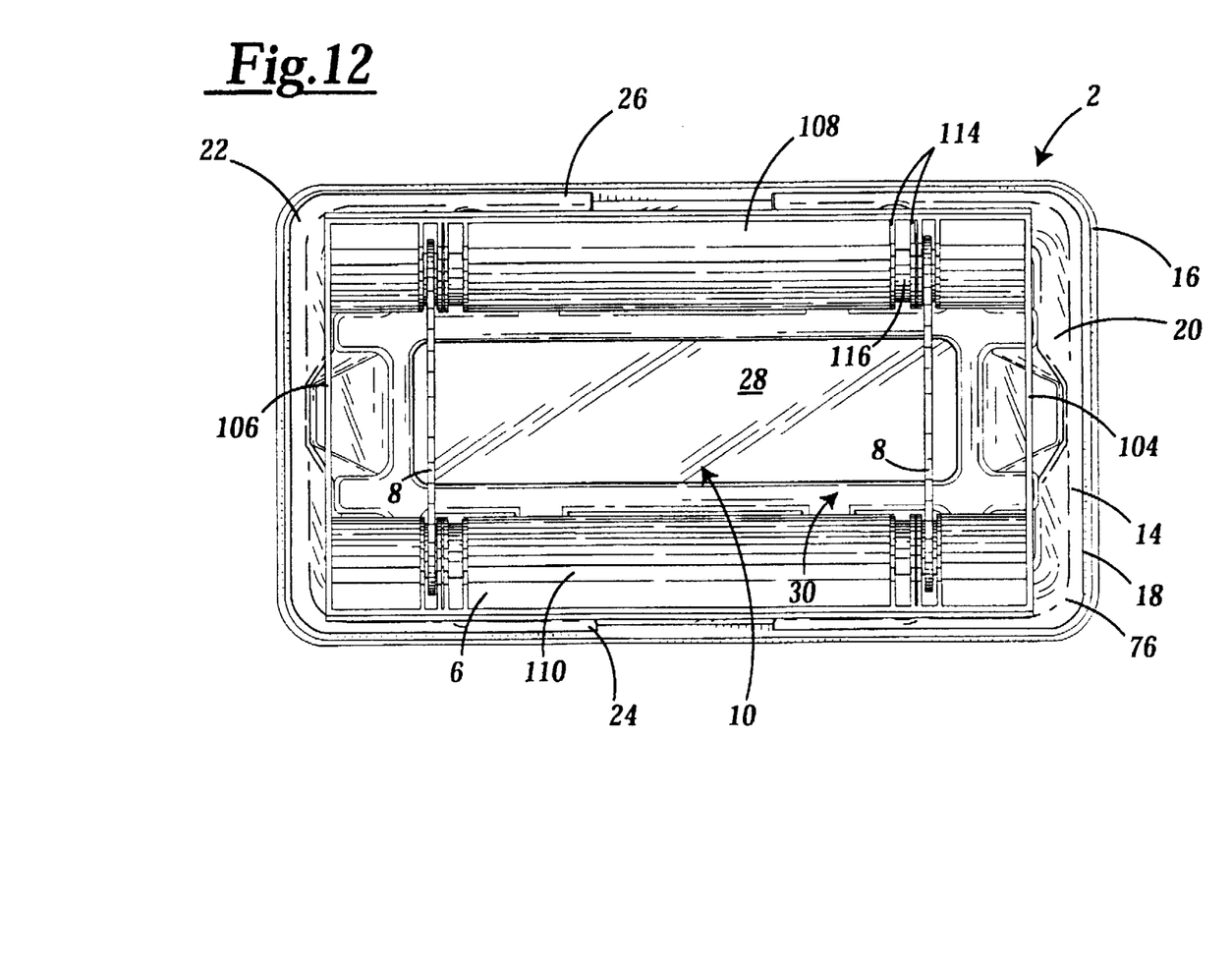
FIG. 12 is a view of the inside of the base.
Figure 13:
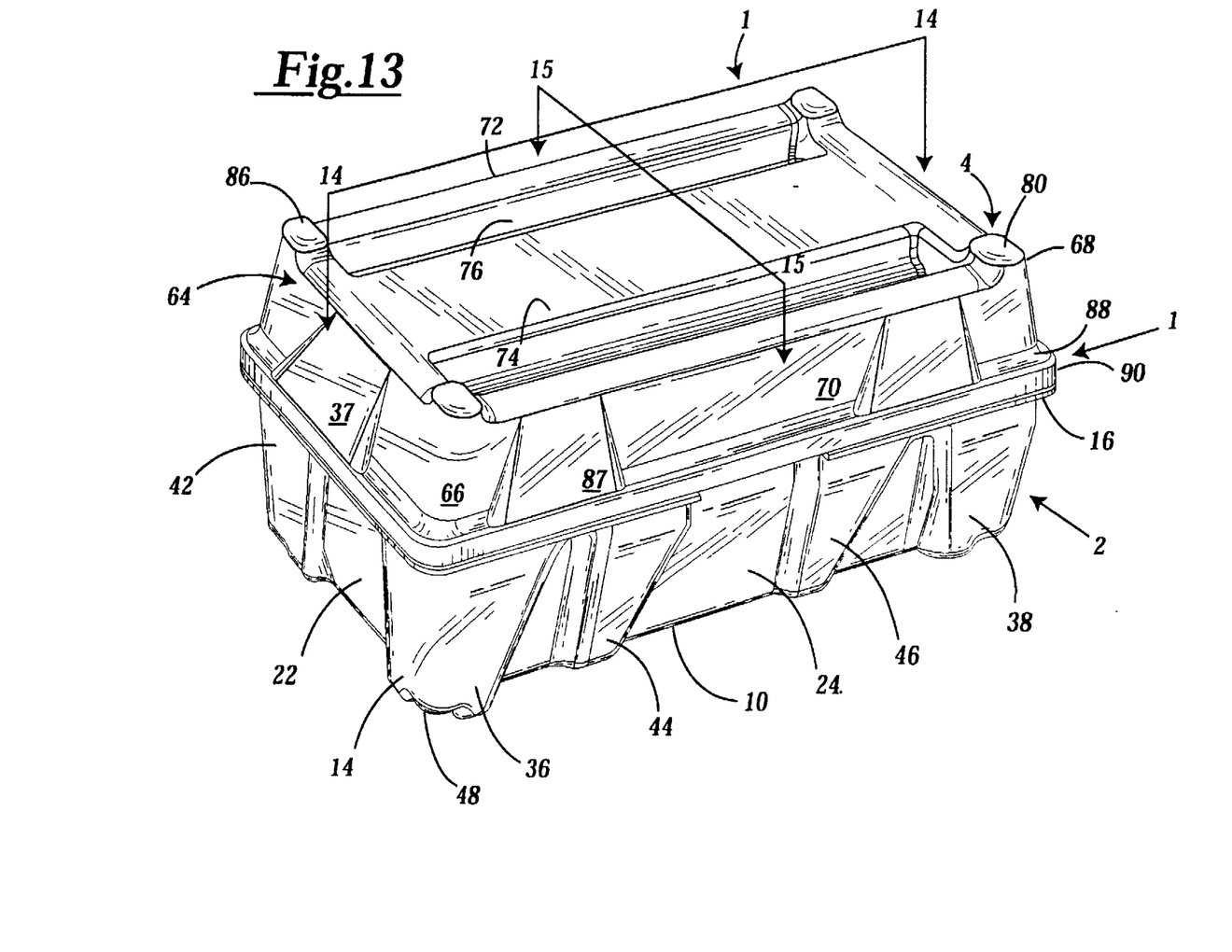
FIG. 13 is a perspective view of an alternative embodiment of the improved disk package.
Figure 14:
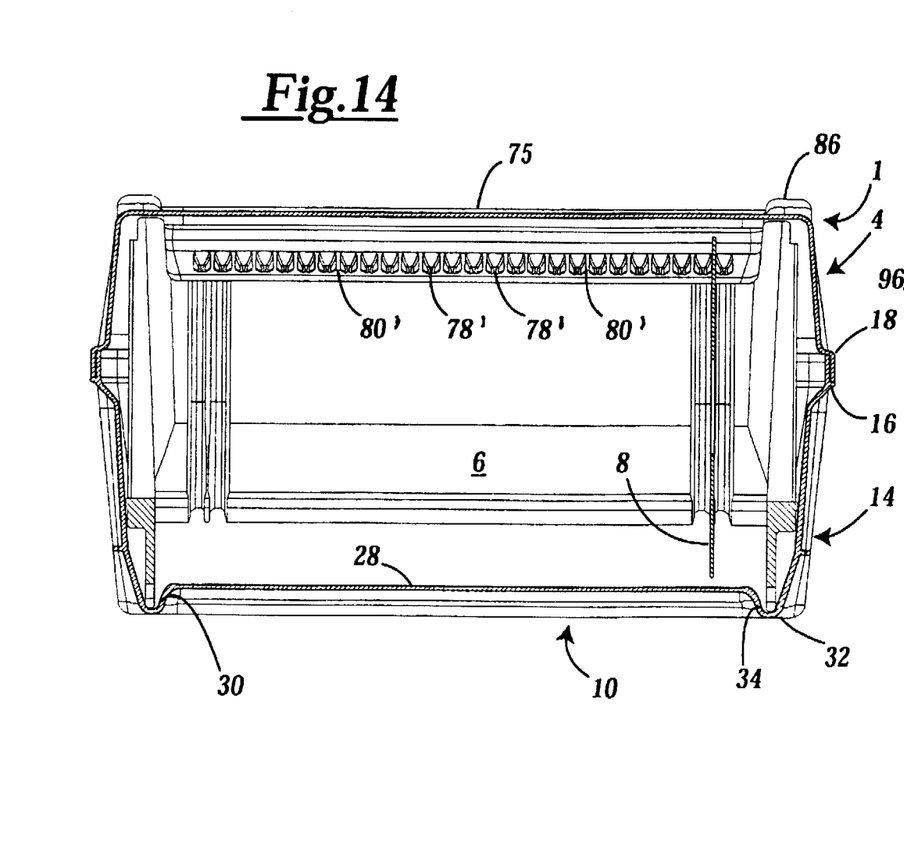
FIG. 14 shows a cross-section through line 14—14 in FIG. 13.
Figure 15:
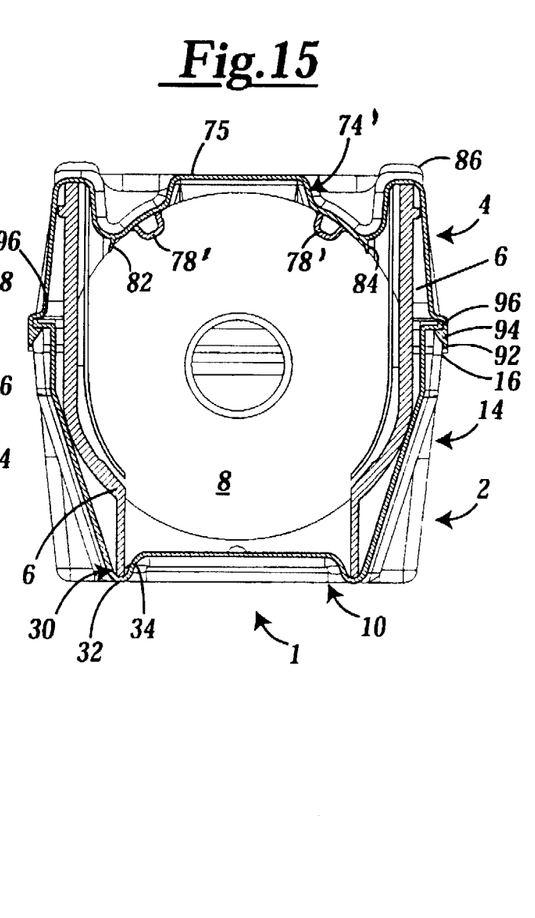
FIG. 15 shows a cross-section through line 15—15 in FIG. 13.
Figure 16:
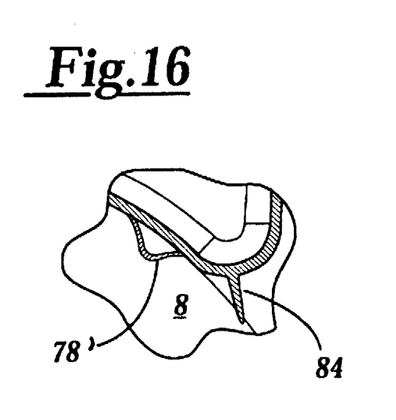
FIG. 16 is an enlarged view of a portion of FIG. 15 showing how the teeth and cushions of the alternative embodiment engage the disks.
Figure 17:
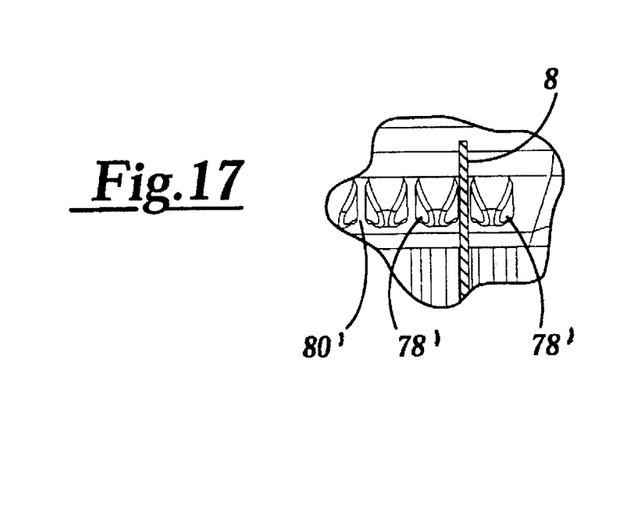
FIG. 17 is an enlarged view of a portion of FIG. 14 showing how the teeth and slots of the alternative embodiment cooperate to receive and hold the disks.
Figure 18:
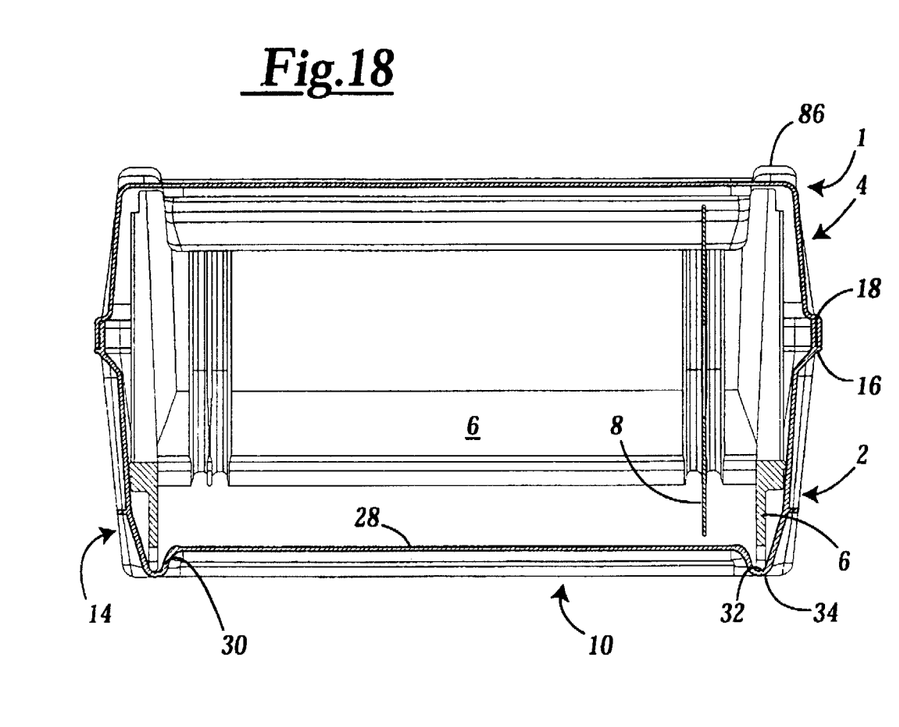
FIG. 18 is a cross-sectional view, similar to FIG. 14, showing the interior of a package made in accordance with a second alternative embodiment.
Figure 19:
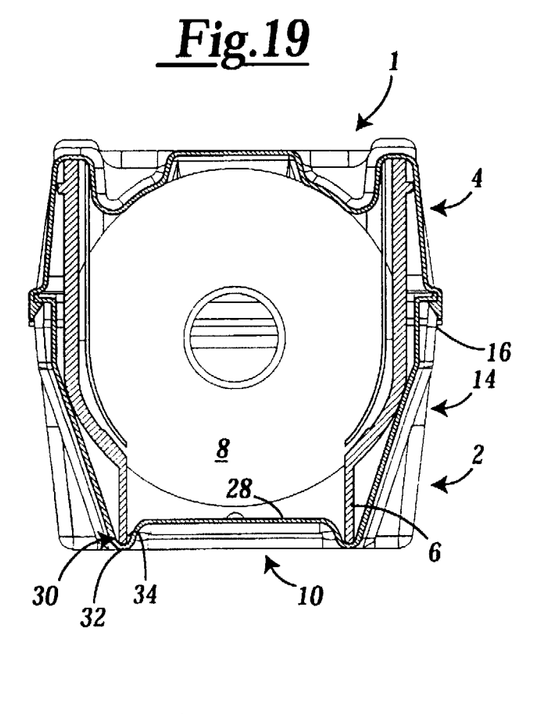
FIG. 19 is a cross-sectional view, similar to FIG. 15, showing the interior of a package made in accordance with second alternative embodiment.

As indicated above, the continuous side wall 14 shown in FIG. 1 extends upward from the outside edge of the bottom 10. The continuous side wall 14 includes four corner gussets 36, 38, 40 and 42 (FIGS. 2, 3 and 5). Two additional gussets 44 and 46 are located on each of the portions of wall 14 running along the longer sides 24 and 26 of the base 2. This arrangement of gussets 36–46 greatly increases the strength of base 2. Also, to promote easy stacking and unstacking of disk packages made in accordance with the present invention, each corner gusset 36–42 has a pad 48 in its bottom for stacking one disk package of the present invention on top of another.

Figure 20:
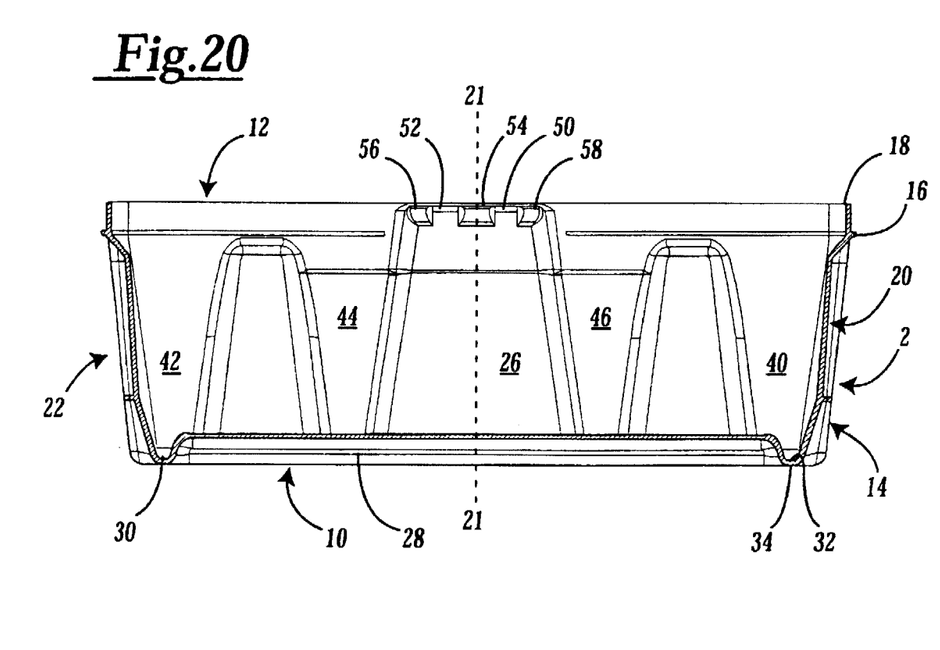
FIG. 20 is a cross-sectional view like that of FIG. 6 with the cover and cassette removed to show the inside of the side wall of the base.
Figure 21:
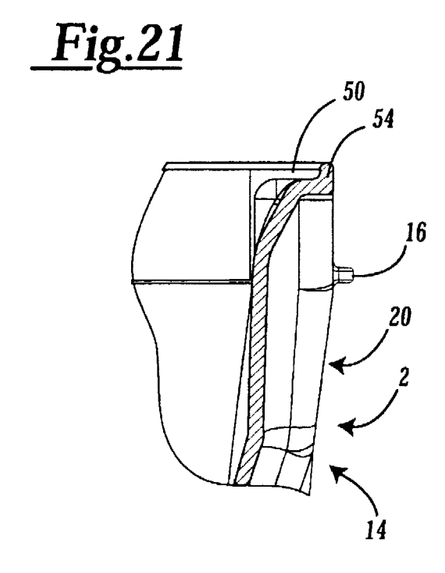
FIG. 21 is a cross-section through line 21—21 in FIG. 20.
Figure 22:
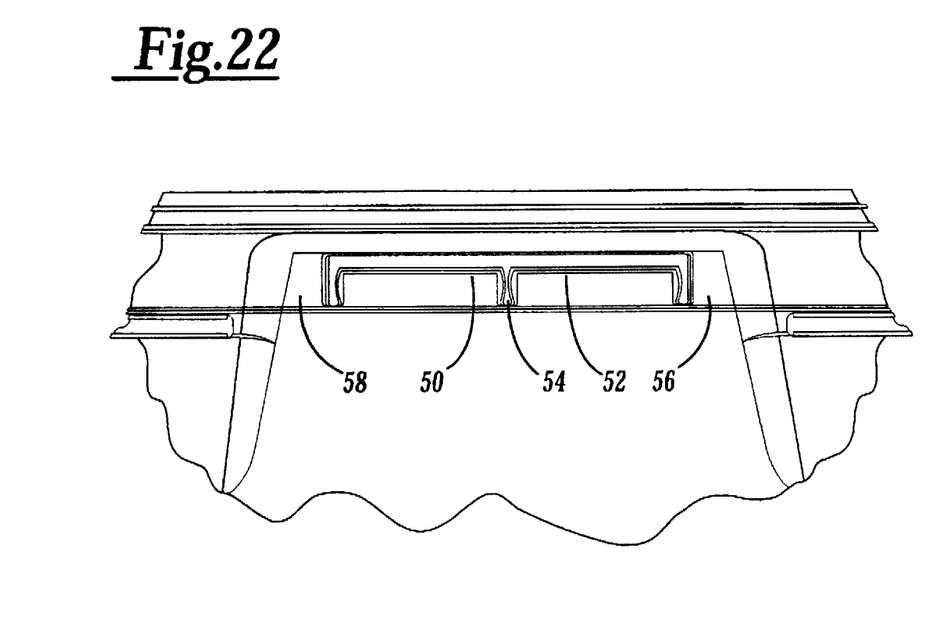
FIG. 22 is a partial view of the exterior of the base showing the components on the base which cooperate with components on the cover to latch the cover to the base.

Additional detail related to the structure of the base 2 is provided in FIGS. 20–22. These Figures are included to specifically explain the position and structure of the latching components of the base 2.

As indicated above, memory disks can be damaged by loose particles in the storage chamber of a shipping container. One way that such particles can be generated is by the rubbing action of latching components. An important feature of the present invention is the location of all surfaces which rub together during latching of the base 2 and cover 4 outside the disk storage chamber. This feature prevents any particles generated during the latching or unlatching operation from entering the storage chamber where they can cause damage.

As shown in FIGS. 20–22, the base 2 includes two outwardly projecting ledge members 50 and 52. Also shown are a center support member 54 and a pair of outer supports 56 and 58. Supports 54, 56 and 58 prevent the ledge members from flexing. They also ensure proper alignment between the ledge members 50 and 52 and the latching members of the cover as described in greater detail below.

The cover 4 of the present invention has a closed top 60, an open bottom 62, and a continuous side wall 64 projecting downward from the top 60. The cover 4 has two opposing shorter sides 66 and 68 and two opposing longer sides 70 and 72. The top 60 of cover 4 has a center section 74 surrounded by a channel 76. Center section 74 has an arch-shaped configuration. At the top of arch-shaped center section 74 are a plurality of tooth-like locators 78 which define disk receiving slots 80. When cover 4 is in the closed position, the top edges of each disk 8 is located within a separate slot 80 between adjacent teeth 78. The teeth 78 serve to hold the top edges of the disks 8 apart and prevent tilting within the disk package 1. Projecting downward from opposite sides of the arch-shaped center section 74 are longitudinally extending cushions 82 and 84. When the cover 4 is in the closed position, cushions 82 and 84 engage the edges of the disks 8 preventing the disks from moving freely and rattling.

As noted above, the disk package 1 is intended to be used with a disk cassette 6. When a cassette 6, loaded with disks 8, is in place in the base 2 and the cover 4 is in the closed position, the top edges of the cassette 6 are received and held in the channel 76 of the cover 4 in a manner similar to the way the bottom edges of cassette 6 are received and held in the channel 30 of the base 2.

Top 60 of cover 4 includes four raised platforms 86 at the corners. These raised platforms 86 are used in stacking the disk packages 1. More specifically, when the disk packages are stacked, the four pads 48 on the base 2 of one package 1 engage the four platforms 86 on the cover of another package 1 to support one of the packages above the other.

The continuous side wall 64 of cover 4 shown in FIG. 1 will now be described. The side wall 64 projects downward from the channel 76 of the cover 4. The side wall has two gussets 87 on each of the longer sides 70 and 72 and one gusset 87 along each of the shorter sides 66 and 68. This arrangement significantly increases the strength and durability of the cover 4. Near the bottom of the side wall 64 is an outwardly projecting ledge 88. Projecting downward from the outer edge of ledge 88 is a ramp surface 90. Projecting inward from surface 90 along each of sides 70 and 72 are a pair of barbs or latches 92 which are used to selectively hold the cover 4 in the closed position with respect to the base 2. The barb-shaped latches 92 each have a ramped surface 94 and a catch surface 96.

When one wishes to close the disk package 1, the cover 4 is placed over the base 2. More particularly, the surface 90 is positioned to telescope over the portion of side wall 14 of base 2 above rim 16. As these parts are pushed together, the ramped surfaces 94 engage ledge members 50 and 52 and the latches 92 are pushed outward relative to the base 2 until the catch surfaces 96 reach the ledge members 50 and 52. The latches 92 then snap back, capturing ledge members 50 and 52 with the barbed catch surfaces 96 to hold the base 2 and cover 4 together. The cover 4 can be removed from the base 2 by pulling out on the side wall of the cover 4 near the latches 92 until the latch surfaces 96 no longer engage the ledge members 50 and 52 and then lifting the cover 4 off the base 2. The supports 54, 56 and 58 ensure proper alignment of the ledge members 50 and 52 and barbed catch surfaces 96.

Two alternative embodiments having different covers 4 are shown in FIGS. 13 through 17. From the outside, both of these alternative embodiments have the same appearance shown in FIG. 13. The cover 4 of these embodiments differs from the embodiment shown in FIG. 1 in several respects. First, the center arch-shaped section 74 of the cover 4 is replaced by a raised section 74' with a flat top 75. Second, the teeth 78 and slots 80 on the arch-shaped center section 74 of the embodiments shown in FIG. 1 have been eliminated. In the case of the alternative embodiment shown in FIGS. 14 through 17, two rows comprising teeth 78' and slots 80' extend into the package from the longer sides of the channel 76. The two rows are parallel to each other. The teeth 78' and slots 80' in one row oppose and are aligned with the teeth 78' and slots 80' in the other row. Thus, when the package is closed, a pair of slots 80' (one in each row) hold the disks 8 apart to prevent tilting within the disk package 1. In the embodiment showing in FIGS. 18 and 19, no teeth or slots are present in the cover. The disks are held apart either exclusively by teeth and slots in a separate cassette 6 or by the combination of the teeth and slots in cassette 6 and contact of the channel 76 with the edges of the disks.

As indicated above, the disk package 1 of the present invention incorporates a cassette 6 which holds a set of disks 8 so that the disks need not be individually transferred to a different transport package for each manufacturing operation. As shown, for example, in FIGS. 6 and 7, the cassette 6 will typically have an open top for insertion and removal of disks 8 therefrom. The bottom is also typically open. The cassette 6 has a pair of end walls 104 and 106 and a pair of side walls 108 and 110. The side walls 108 and 110 typically have surfaces 112 for supporting the disks 8 and a set of teeth 114 forming slots 116 which hold the disks 8 in a spaced apart, parallel relationship to each other. As indicated above, the bottoms of cassette walls 104, 106, 108 and 110 are intended to be received and held by channel 30 of base 2. Likewise, the top portions of cassette walls 104, 106, 108 and 110 are positioned in and held by channel 76 of cover 4 when the cover is in the closed position.

It can be seen that the cooperation between the top 4 and base 2 with the disk cassette 6, and with the peripheral edges of the disks contained within the cassette, positively hold the disks in vertical upright position, preventing any scratching or marring thereof. They also provide a sealed, dust-proof environment during storage such that the disks will be in pristine undamaged condition at the time they are to be assembled as a hard disk drive in a computer.

What is claimed is:

1. A storage and transport package for enclosing a plurality of disks of a predetermined diameter, each with a peripheral edge, said package comprising:

(a) a cassette (b) a base including a closed bottom having two opposing larger sides and two opposing shorter sides, an open top, a first continuous side wall projecting from the closed bottom to the open top, said closed bottom including a center section surrounded by a channel for receiving and retaining a bottom portion of said cassette, said first continuous side wall including a rim projecting outward from said first continuous side wall near the top of said first continuous side wall, four corner gussets, and two additional gussets located on each of the two portions of said first continuous side walls projecting from the two longer sides of the closed bottom; and (b) a cover including a closed top, an open bottom, a second continuous side wall projecting from the closed top to the open bottom, said closed top including a center section surrounded by a channel for receiving and retaining a top portion of said cassette, said second continuous side wall having, an outward projecting ledge, a surface projecting downwardly from said ledge, means for latching said cover to said base, and a plurality of gussets extending between said outward projecting ledge and the closed top.

2. The package of claim 1 wherein said means for latching said cover to said base includes a ramped surface and a catch surface.

3. The package of claim 2 wherein said catch surface engages said rim on said base to hold said base and cover together when the package is closed.

4. The package of claim 1 wherein the surface of the cover projecting downwardly from the ledge telescopes over the portion of the side wall of the base above the rim of the base so that when the package is closed, said surface surrounds the portion of the side wall of the base above said rim.

5. The package of claim 1 further including four pads on the base and four raised platforms on the cover, the pads of said package adapted to engage the platforms of another similar package when said package is stacked one on top of another package.

6. The package of claim 1 wherein said center section of said cover has an arch shape.

7. The package of claim 1 wherein said center section of said cover has a plurality of teeth which cooperate to form dish holding slots, said teeth having first and second sides.

8. The package of claim 7 wherein said cover has a first disk engaging cushion extending longitudinally along the first side of said teeth and a second disk engaging cushion extending longitudinally along the second side of said teeth, said disk engaging cushions engaging the peripheral edges of the disks when the cover is closed to reduce movement of the disks.

9. The package of claim 1 further including a plurality of teeth projecting from said channel to form pairs of aligned slots for holding said disks apart.

* * * * *